US008790828B2

(12) United States Patent
Specht et al.

(10) Patent No.: US 8,790,828 B2
(45) Date of Patent: Jul. 29, 2014

(54) ANODE BALANCED LITHIUM—IRON DISULFIDE PRIMARY CELL

(71) Applicant: The Gillette Company, Boston, MA (US)

(72) Inventors: Steven Jeffrey Specht, Brookfield, CT (US); Michael Pozin, Brookfield, CT (US); Yelena Valentinovna Kouznetsova, Brookfield, CT (US); Bhupendra Kanchanial Patel, Danbury, CT (US); Fred Joseph Berkowitz, New Milford, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 14/068,129

(22) Filed: Oct. 31, 2013

(65) Prior Publication Data

US 2014/0079972 A1    Mar. 20, 2014

Related U.S. Application Data

(63) Continuation of application No. 11/999,308, filed on Dec. 5, 2007, now Pat. No. 8,617,743.

(51) Int. Cl.
| | | |
|---|---|---|
| H01M 2/16 | (2006.01) | |
| H01M 4/13 | (2010.01) | |
| H01M 4/58 | (2010.01) | |
| H01M 4/72 | (2006.01) | |
| H01M 4/136 | (2010.01) | |
| H01M 6/16 | (2006.01) | |
| H01M 4/12 | (2006.01) | |
| H01M 4/38 | (2006.01) | |
| H01M 6/10 | (2006.01) | |
| H01M 4/02 | (2006.01) | |
| H01M 4/04 | (2006.01) | |
| H01M 2/02 | (2006.01) | |
| H01M 6/50 | (2006.01) | |

(52) U.S. Cl.
CPC ....... *H01M 4/58* (2013.01); *H01M 4/12* (2013.01); *H01M 4/581* (2013.01); *H01M 6/10* (2013.01); *Y02E 60/12* (2013.01); *H01M 2004/021* (2013.01); *H01M 4/0435* (2013.01); *H01M 2/022* (2013.01); *H01M 2300/0037* (2013.01); *H01M 6/166* (2013.01); *H01M 2006/5094* (2013.01); *H01M 6/168* (2013.01); *H01M 6/50* (2013.01); *H01M 2/1653* (2013.01); *H01M 4/382* (2013.01); *H01M 4/5815* (2013.01)
USPC ....... 429/221; 429/231.95; 429/245; 429/254

(58) Field of Classification Search
USPC .............................. 429/221, 231.95, 245, 254
See application file for complete search history.

(56) References Cited

U.S. PATENT DOCUMENTS 4,952,330 A    8/1990  Leger
4,959,281 A    9/1990  Nishi
(Continued)

FOREIGN PATENT DOCUMENTS

EP           0529802 A    3/1993
JP      2007-157332 A    6/2007

*Primary Examiner* — Sean P Cullen
(74) *Attorney, Agent, or Firm* — Leo J. White; Kevin C. Johnson; Steven W. Miller

(57) ABSTRACT

A primary electrochemical cell having an anode comprising lithium and a cathode comprising iron disulfide ($FeS_2$) and carbon particles. The cell is balanced so that the anode is in theoretical capacity excess (mAmp-hrs) compared to the theoretical capacity of the cathode. The anode and cathode can be spirally wound with separator therebetween and inserted into the cell casing with electrolyte then added. The electrolyte comprises a lithium salt dissolved in organic solvent.

13 Claims, 4 Drawing Sheets

(56) References Cited

U.S. PATENT DOCUMENTS

| | | |
|---|---|---|
| 5,229,227 A | 7/1993 | Webber |
| 5,290,414 A | 3/1994 | Marple |
| 5,432,030 A | 7/1995 | Vourlis |
| 5,514,491 A | 5/1996 | Webber |
| 5,698,176 A | 12/1997 | Capparella |
| 6,218,054 B1 | 4/2001 | Webber |
| 6,849,360 B2 | 2/2005 | Marple |
| 6,866,965 B2 | 3/2005 | Lee |
| 7,157,185 B2 | 1/2007 | Marple |
| 2005/0079410 A1 | 4/2005 | Randell et al. |
| 2005/0112462 A1 | 5/2005 | Marple |
| 2005/0233214 A1 | 10/2005 | Marple |
| 2005/0244706 A1 | 11/2005 | Wu |
| 2005/0277023 A1 | 12/2005 | Marple |
| 2006/0046152 A1 | 3/2006 | Webber |
| 2006/0046153 A1 | 3/2006 | Webber |
| 2006/0046154 A1 | 3/2006 | Webber |
| 2006/0228620 A1 | 10/2006 | Martinson |
| 2007/0015048 A1 | 1/2007 | Lee et al. |
| 2007/0202409 A1 | 8/2007 | Yamakawa |
| 2007/0218357 A1 | 9/2007 | Takagi |

ANODE BALANCED LITHIUM—IRON DISULFIDE PRIMARY CELL

FIELD OF THE INVENTION

The invention relates to lithium primary cells having an anode comprising lithium and a cathode comprising iron disulfide, wherein the ratio of the theoretical capacity of the anode to theoretical capacity of the cathode is greater than 1.0.

BACKGROUND OF THE INVENTION

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in anonaqueous solvent. The cells are referenced in the art as primary lithium cells and are generally not intended to be rechargeable. A common primary lithium cell has a lithium anode and cathode comprising $MnO_2$ ($Li/MnO_2$ cell) used to power 35 mm cameras. Alternative primary lithium cells with lithium metal anodes but having different cathodes are also known. Such cells, for example, have cathodes comprising iron disulfide ($FeS_2$) and are designated $Li/FeS_2$ cells. The iron disulfide ($FeS_2$) is also known as pyrite.

The $Li/MnO_2$ cells or $Li/FeS_2$ cells are typically in the form of cylindrical cells, typically an AA or AAA size cell or ⅔A size cell having wound electrodes with separator sheet therebetween. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is much higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons reduce the valence state of $Fe^{+2}$ in $FeS_2$ to Fe and the remaining 2 electrons reduce the valence of sulfur from −1 in $FeS_2$ to −2 in $Li_2S$. In order to carry out the electrochemical reaction the lithium ions, $Li^+$, produced at the anode must transport through the separator and electrolyte medium and to the cathode.

Overall the $Li/FeS_2$ cell is much more powerful than the same size $Zn/MnO_2$ alkaline cell. That is, for a given continuous current drain, particularly for higher current drain over 200 milliAmp, as reflected by the voltage vs. time discharge profile the voltage drops off much less quickly for the $Li/FeS_2$ cell than the $Zn/MnO_2$ alkaline cell. This results in a higher energy output obtainable from a $Li/FeS_2$ cell compared to that obtainable for a same size alkaline cell. The higher energy output of the $Li/FeS_2$ cell is also clearly shown more directly in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is considerably above that for the same size alkaline cell. This is despite that the starting voltage of both cells (OCV) is about the same, namely, between about 1.2 and 1.8 volt.

Thus, the $Li/FeS_2$ cell has the advantage over same size alkaline cell, for example, AAAA, AAA, AA, C or D size or any other size in that the $Li/FeS_2$ may be used interchangeably with the conventional $Zn/MnO_2$ alkaline cell and will have greater service life, particularly for higher power demands. Similarly the $Li/FeS_2$ cell which is primary (nonrechargeable) can be used as a replacement for the same size rechargeable nickel metal hydride cell, which has about the same voltage (fresh) as the $Li/FeS_2$ cell.

The electrochemical cell's anode and cathode may be balanced so that the theoretical capacity (mAmp-hr) of either the anode or cathode is in excess. For example, $Zn/MnO_2$ alkaline cells are typically balanced so that the theoretical capacity of the cathode is greater than the theoretical capacity of the anode. See, e.g. U.S. Pat. No. 6,585,881 B2 wherein it is stated that the ratio of theoretical capacity of the cathode to the theoretical capacity of the anode is about 1.05 at col. 15, lines 33-36. In U.S. Pat. Nos. 6,849,360 B2 and 7,157,185 B2 it is indicated that in the $Li/FeS_2$ cell the anode and cathode should be balanced so that the "input ratio" of anode to cathode is less than or equal to 1.0. The term input ratio as used in the U.S. Pat. Nos. 6,849,360 and 7,157,185 references computes to the same value as the theoretical capacity ratio of anode to cathode. Thus, the two terms "input ratio" based on interfacial area and "anode to cathode theoretical capacity ratio" are equivalent, except that in the '360 and '185 patents the theoretical capacity of the cathode is based entirely on $FeS_2$ being the only electrochemically active material therein. There are no other cathode active materials, other than $FeS_2$, contemplated in these latter two references so the theoretical cathode capacity of the cathode is based only on the presence of $FeS_2$ in the cathode.

A better definition of the term theoretical capacity of the anode involves computing the ideal capacity (mAmp-hrs) of all the anode active materials therein, and the theoretical capacity of the cathode involves computing the ideal capacity (mAmp-hrs) of all the cathode active materials therein. It shall be understood that the use of such terms theoretical capacity of anode and theoretical capacity of cathode as used in the present application shall be so defined. The "anode active" materials and "cathode active" materials are defined as the materials in the anode and cathode, respectively, which are capable of useful electrochemical discharge. That is, the "anode active materials" and "cathode active materials" promote current flow between the cell's negative and positive terminals when an external circuit between these terminals is connected and the cell is used in normal manner.

In conventional $Zn/MnO_2$ or $Li/FeS_2$ primary cells it is considered desirable to balance the cells so that the theoretical capacity of the cathode is greater than the theoretical capacity of the anode. One reason for this is that the cathode active material discharges less efficiently than the anode active material. That is, the cathode utilization (the percentage of theoretical cathode capacity which is actually attained during cell discharge) is lower for the cathode active material than the anode active material. As a result, the cell is normally balanced so that the cathode is in theoretical capacity excess so that when the cell is fully discharged there will be little, if any, anode active material left in the cell. However, in a $Li/FeS_2$ cell, if the cell is balanced in this manner with cathode in excess as in U.S. Pat. Nos. 6,849,360 B2 and 7,157,185

B2 there is risk of creating discontinuities in the lithium anode surface as the cell continues to discharge. That is, as cell discharge proceeds, the lithium anode layer becomes thinner and thinner and eventually can lead to "severing" of the electrical contact between anode and anode current collector, which electrically connects the anode material to the negative terminal. This of course can result in delay or permanent disruption of cell performance before the expected cutoff voltage is reached.

The $Li/FeS_2$ cell requires and electrolyte formed of a lithium salt dissolved in organic electrolyte solvent, since the lithium anode is highly reactive with water. One of the difficulties associated with the manufacture of a $Li/FeS_2$ cell is the need to add good binding material to the cathode formulation to bind the $Li/FeS_2$ and carbon particles together in the cathode. The binding material must also be sufficiently adhesive to cause the cathode coating to adhere uniformly and strongly to the substrate to which the cathode coating is applied and yet must resist chemical attack by the electrolyte.

The cathode material may be initially prepared in the form of a slurry mixture, which can be readily coated onto the substrate, preferably a metal substrate by conventional coating methods. The electrolyte added to the cell must be a suitable electrolyte for the $Li/FeS_2$ system allowing the necessary electrochemical reactions to occur efficiently over the range of high power output desired. The electrolyte must exhibit good ionic conductivity and also be sufficiently stable, that is, non reactive, with the undischarged electrode materials (anode and cathode components) and also non reactive with the discharge products. This is because undesirable oxidation/reduction reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials. Additionally, the electrolyte should enable good ionic mobility and transport of the lithium ion ($Li^+$) from anode to cathode so that it can engage in the necessary reduction reaction resulting in $Li_2S$ product in the cathode.

Primary lithium cells are in use as a power source for digital flash cameras, which require operation at higher pulsed power demands than is supplied by individual alkaline cells. Primary lithium cells are conventionally formed of an electrode composite comprising an anode formed of a sheet of lithium or lithium alloy, a cathode formed of a coating of cathode active material comprising $MnO_2$ or $FeS_2$ on a conductive metal substrate (cathode substrate) and a sheet of electrolyte permeable separator material therebetween. The electrode composite may be spirally wound and inserted into the cell casing, for examples, as shown in U.S. Pat. No. 4,707,421. A cathode coating mixture for the $Li/FeS_2$ cell is described in U.S. Pat. No. 6,849,360. A portion of the anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap with insulator disk therebetween to seal the casing's open end. The cell may be fitted internally with a PTC (positive thermal coefficient) device or the like to shut down (increase the internal resistance) of the cell in case the cell is exposed to abusive conditions such as short circuit discharge or overheating.

The anode in a $Li/FeS_2$ cell can be formed by laminating a layer of lithium on a metallic substrate such as copper. However, the anode may be formed of a sheet of lithium or lithium alloy without any substrate.

The electrolyte used in a primary $Li/FeS_2$ cells is formed of a "lithium salt" dissolved in an "organic solvent". Representative lithium salts which may be used in electrolytes for $Li/FeS_2$ primary cells are referenced in U.S. Pat. Nos. 5,290,414 and 6,849,360 B2 and include such salts as: Lithium trifluoromethanesulfonate, $LiCF_3SO_3$ (LiTFS); lithium bistrifluoromethylsulfonyl imide, $Li(CF_3SO_2)_2N$ (LiTFSI); lithium iodide, LiI; lithium bromide, LiBr; lithium tetrafluoroborate, $LiBF_4$; lithium hexafluorophosphate, $LiPF_6$; lithium hexafluoroarsenate, $LiAsF_6$; $Li(CF_3SO_2)_3C$, and various mixtures. In the art of $Li/FeS_2$ electrochemistry, lithium salts are not simply interchangeable as specific salts are workable with specific electrolyte solvent mixtures.

In U.S. Pat. No. 5,290,414 (Marple) is reported use of a beneficial electrolyte for $FeS_2$ cells, wherein the electrolyte comprises a lithium salt dissolved in a solvent comprising 1,3-dioxolane in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimetoxyethane (DME). As given in the example the 1,2-dimethoxyethane (DME) is present in the electrolyte in substantial amount, i.e., at either 40 or 75 vol. % (col. 7, lines 47-54). A specific lithium salt ionizable in such solvent mixture(s), as given in the example, is lithium trifluoromethane sulfonate, $LiCF_3SO_3$. Another lithium salt, namely lithium bistrifluoromethylsulfonyl imide, $Li(CF_3SO_2)_2N$ also mentioned at col. 7, line 18-19. The reference teaches that a third solvent may optionally be added selected from 3,5-dimethlyisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19) with the preferred being 3,5-dimethylisoxazole.

In U.S. Pat. No. 6,849,360 B2 (Marple) is disclosed an electrolyte for an $Li/FeS_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48.)

In US 2007/0202409 A1 (Yamakawa) it is stated with reference to the electrolyte solvent for the $Li/FeS_2$ cell at para. 33: "Examples of the organic solvent include propylene carbonate, ethylene carbonate, 1,2-dimethoxy ethane, γ-butyrolactone, tetrahydrofuran, 2-methyl tetrahydrofuran, 1,3 dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the $Li/FeS_2$ cell depending on the particular lithium salt to be dissolved in the solvent. (See, e.g. above U.S. Pat. Nos. 5,290,414 and 6,849,360). The reference Yamakawa does not teach which combination of solvents from the above list are to be used with any given lithium salt.

Thus, it should be evident from the above representative references that the choice of a particular organic solvent or mixture of different organic solvents for use in conjunction with any one or more lithium salts to produce a suitable electrolyte for the $Li/FeS_2$ cell is challenging. This is not to say that many combinations of lithium salts and organic solvents do not produce a $Li/FeS_2$ cell will not work at all. But rather the challenge associated with such cells using an electrolyte formed with just any combination of known lithium salt and organic solvent is that the problems encountered will likely be very substantial, thus making the cell impractical for commercial usage. The history of development of lithium cells in general, whether lithium primary cells, e.g. non rechargeable Li/MnO$_2$ or Li/FeS$_2$ cells or rechargeable lithium or lithium ion cells reveals that just any combination of lithium salt and organic solvent cannot be expected to result in a good cell, that is, exhibiting good, reliable performance. Thus, references which merely provide long lists of possible organic solvents for Li/FeS$_2$ cells do not necessarily teach combinations of solvents or combination of specific lithium salts in specific solvent mixtures, which exhibit particular or unexpected benefit.

Accordingly, it is desired to produce a Li/FeS$_2$ cell with a cathode having improved utilization (efficiency) which can enable benefits in improved cell performance.

It is desired to balance the FeS$_2$ cell so that the lithium anode material is in theoretical capacity (mAmp-hrs) excess in relation to the theoretical capacity of the cathode, thereby reducing the risk of severing of the electrical connection between the anode material and anode current collector as the anode lithium layer becomes increasingly thinner during cell discharge.

It is desired to increase the anode/cathode interfacial surface area in a Li/FeS$_2$ wound cell resulting in thinner cathode without sacrificing capacity.

It is desired to produce a primary (nonrechargeable) Li/FeS$_2$ cell having good rate capability so that the cell may be used in place of rechargeable batteries to power digital cameras.

SUMMARY OF THE INVENTION

The invention is directed to lithium primary cells wherein the anode comprises lithium metal. The lithium may be alloyed with small amounts of other metal, for example aluminum, which typically comprises less than about 1 or 2 wt. % of the lithium alloy. The lithium which forms the anode active material, is preferably in the form of a thin foil. The cell has a cathode comprising the cathode active material iron disulfide (FeS$_2$), commonly known as "pyrite". The cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising iron disulfide (FeS$_2$) and carbon particles onto a substrate, preferably a conductive metal substrate. The FeS$_2$ and carbon particles are bound to the substrate using desirably an elastomeric, preferably, a styrene-ethylene/butylene-styrene (SEBS) block copolymer such as Kraton G1651 elastomer (Kraton Polymers, Houston, Tex.). This polymer is a filmformer, and possesses good affinity and cohesive properties for the FeS$_2$ particles as well as for conductive carbon particle additives in the cathode mixture. The polymer resists chemical attack by the electrolyte.

The cathode is formed of a cathode slurry comprising iron disulfide (FeS$_2$) powder, conductive carbon particles, binder material, and solvent. (The term "slurry" as used herein will have its ordinary dictionary meaning and thus be understood to mean a wet mixture comprising solid particles.) The wet cathode slurry is coated onto a substrate which is preferably conductive such as a sheet of aluminum or stainless steel. The substrate functions as a cathode current collector. The solvent is then evaporated leaving dry cathode coating mixture comprising the iron disulfide material and carbon particles preferably including carbon black adhesively bound to each other and with the dry coating bound to the substrate. The preferred carbon black is acetylene black. The carbon may optionally include graphite particles blended therein.

After the wet cathode slurry is coated onto the substrate, the coated substrate is placed in an oven and heated at elevated temperatures until the solvent evaporates, as disclosed in commonly assigned U.S. patent application Ser. No. 11/516,534, filed Sep. 6, 2006, and has published as U.S. 2008/0057403 A1. The resulting product is a dry cathode coating comprising iron disulfide and carbon particles bound to the conductive substrate. On a dry basis, the cathode preferably contains no more than 4% by weight binder, and between 85 and 95% by weight of FeS$_2$. The solids content, that is, the FeS$_2$ particles and conductive carbon particles in the wet cathode slurry is typically between 55 and 70 percent by weight. The viscosity range for the cathode slurry is from about 3500 to 15000 mPas. (mPas=mNewton×sec/m$^2$). After the anode comprising lithium metal and cathode comprising iron disulfide, with separator therebetween, are inserted into the cell housing, a nonaqueous electrolyte is added to the cell.

In a principal aspect of the invention it has been determined that the risk of discontinuities developing on the surface of lithium anode of a Li/FeS$_2$ cell is reduced by balancing the cell so that the theoretical capacity (mAmp-hrs) of the anode is greater than the theoretical capacity (mAmp-hrs) of the cathode. This reduces the chance that the lithium anode will develop discontinuities in its surface or will become severed from electrical contact with the anode current collector as the lithium anode becomes thinner during cell discharge. In accordance with the invention the Li/FeS$_2$ cell is desirably balanced so that the anode to cathode theoretical capacity ratio is greater than 1.0, regardless of cell size. That is, the cell is balanced so that the anode is in theoretical capacity excess as compared to the theoretical capacity of the cathode. Preferably the Li/FeS$_2$ cell is balanced so that the anode to cathode theoretical capacity ratio is between about 1.02 and 1.20, desirably between about 1.05 and 1.15, regardless of cell size. For example, the Li/FeS$_2$ cell size may be AA or AAA cylindrical size or smaller or larger sizes. It shall be understood that the theoretical capacity of the anode and theoretical capacity of the cathode is based on those portions of anode and cathode with separator therebetween so that said anode and cathode portions are dischargeable.

In another aspect of the invention the above indicated Li/FeS$_2$ cell balance is made in conjunction with increasing the interfacial surface area for a given size wound cell, for example, AA or AAA size cylindrical cells. The interfacial area is the largest facing surface area between anode and cathode with separator therebetween, so that said anode and cathode are dischargeable. Area designations (cm$^2$) as recited herein shall be understood to apply to the interfacial area between anode and cathode unless otherwise indicated. For example, in a AA size cell the interfacial area between anode and cathode is increased to a level greater than about 250 cm$^2$, preferably between about 250 and 400 cm$^2$, desirably at about 300 cm$^2$. (The interfacial surface area between anode and cathode of commercial AA size Li/FeS$_2$ wound cells are presently at about 220 cm$^2$.) By increasing the interfacial surface area between anode and cathode the ratio of theoretical cathode capacity (mAmp-hrs) to interfacial surface area (cm$^2$) is reduced. This also reduces the current density (mAmp/cm$^2$) for any given current drain rate. The reduction in ratio of theoretical cathode capacity to interfacial area improves the discharge "utilization" of the cathode as it generally results in thinner cathodes. (The term "utilization" as used herein is the percent of theoretical capacity which is actually attained during cell discharge of either the cathode or anode as specified.)

The increase in interfacial surface area is desirably such that the cell's total capacity is not compromised, despite the thinner cathodes. The improvement in cathode utilization is more apparent at high rate discharge needed to power digital cameras. In accordance with the invention the ratio of theoretical cathode capacity to interfacial area for $Li/FeS_2$ wound cells, in particular AA size cells, is between about 11 and 15 mAmp-hrs/cm$^2$. If each side of the substrate is coated with cathode material then the preceding ratios between 11 and 15 mAmp-hrs/cm$^2$ are applied to each side. (Commercial AA size $Li/FeS_2$ wound cells presently have ratio of theoretical cathode capacity to interfacial area of about 17 per side of substrate.)

In another aspect of the invention as applied to $Li/FeS_2$ wound AAA size cylindrical cells the cathode is preferably coated on each side of a substrate so that there is sufficient loading of cathode active material in the cathode resulting in ratio of theoretical cathode capacity to interfacial area of between about 9 and 17 mAmp-hrs/cm$^2$ per side of the substrate, preferably between about 11 and 15 mAmp-hrs/cm$^2$ per side of the substrate. For AAA size $Li/FeS_2$ cells the anode/cathode interfacial area is desirably greater than about 100 cm$^2$, preferably between about 150 and 200 cm$^2$.

In another aspect of the invention the separator is desirably of microporous polyethylene or microporous polypropylene which is somewhat thinner than conventionally employed in lithium cells. Desirably the separator as applied to the $Li/FeS_2$ wound cells herein have a thickness between about 0.008 and 0.025, for example, about 0.016 mm.

DETAILED DESCRIPTION OF THE INVENTION

Figure 1:
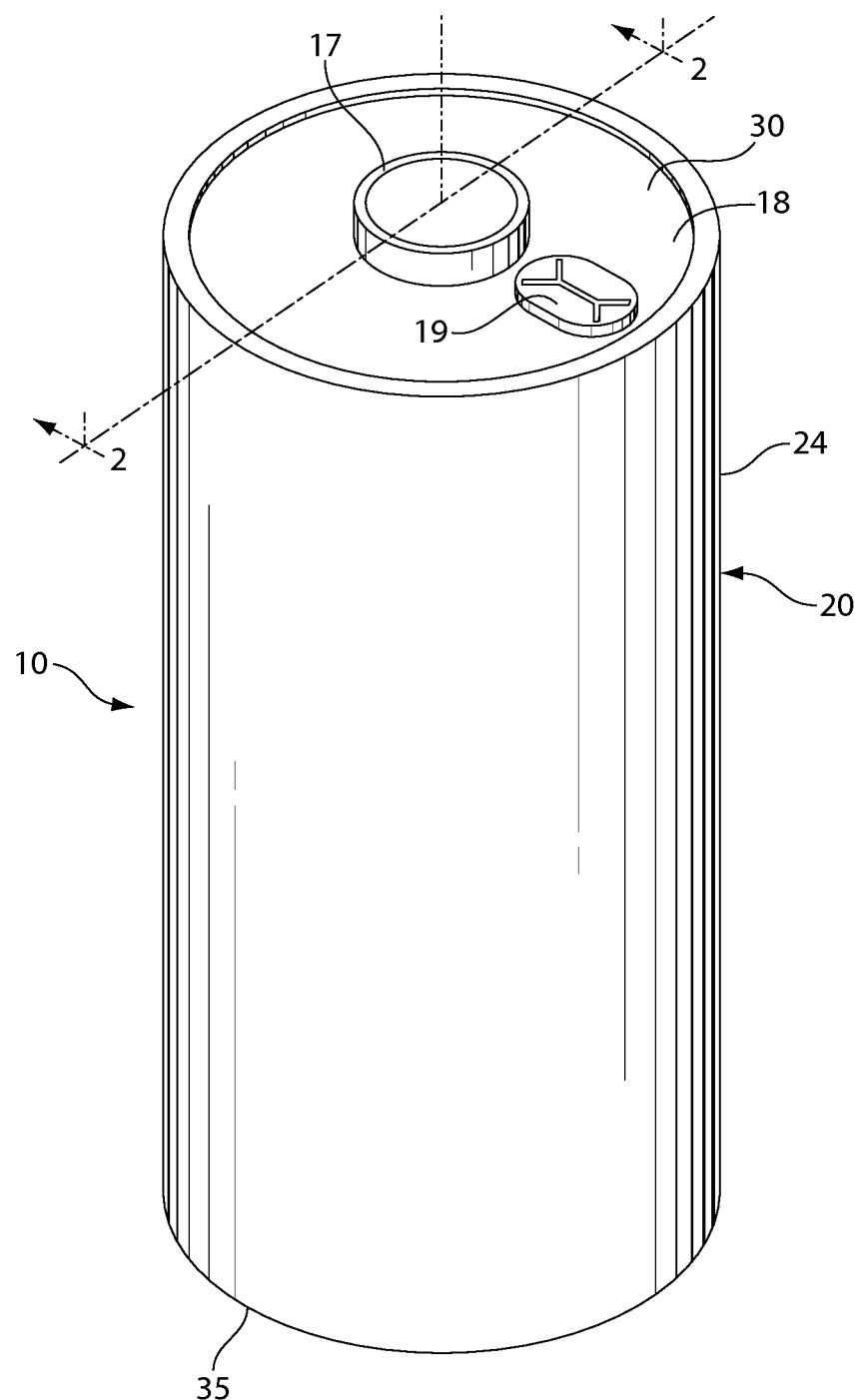
FIG. 1 is an isometric view of an improved $Li/FeS_2$ cell of the invention as presented in a cylindrical cell embodiment.

The $Li/FeS_2$ cell of the invention is desirably in the form of a spirally wound cell as shown in FIGS. 1-5. A desirable wound cell 10 configuration comprising a lithium anode 40 and a cathode composite 62 comprising iron disulfide ($FeS_2$) with separator sheet 50 therebetween is shown in the figures. The anode may comprise a sheet of lithium or lithium alloy 40. The cathode composite may comprise a coating of cathode material 60 comprising iron disulfide ($FeS_2$) which is coated on at least one side of a substrate 65 as shown best in FIGS. 4 and 5. The cathode material 60 may also be coated on both sides of substrate 65. The cathode coating 60 is first coated as a wet cathode slurry onto at least one side of substrate 65 and then dried. Preferably the wet cathode slurry is coated on one side of substrate 65, dried. Preferably the same wet cathode slurry composition is then also coated on the opposite side of substrate 65 and subsequently dried, thus forming dry cathode coating 60 on both sides of substrate 65.

The substrate or grid 65 is preferably an electrically conductive substrate, such as a sheet of aluminum, or stainless steel foil. The substrate 65 may be a continuous solid sheet without apertures or may be a sheet with apertures therein, for example, formed from expanded stainless steel foil or expanded aluminum foil.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum or lithium and calcium. In such case the alloy metal, is present in very small quantity, preferably less than 1 or 2 percent by weight of the lithium alloy. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm desirably between about 0.12 and 0.19 mm.

In accordance with the invention the $Li/FeS_2$ wound cell is designed to have a balance of anode to cathode so that the anode active material is in excess. (The term "anode active material" or "cathode active material" as used herein means the material in the anode or cathode, respectively, which engages in useful electrochemical discharge.) The cell 10, representative of a wound $Li/FeS_2$ cylindrical cell configuration, is balanced so that the theoretical capacity (mAmp-hrs) of the anode is greater than the theoretical capacity of the cathode. The ratio of the theoretical capacity of the anode to the theoretical capacity of the cathode is greater than 1.0, desirably between about 1.02 and 1.20, for example, between about 1.05 and 1.15. The theoretical capacity of the anode, unless otherwise specified, is the sum of the theoretical capacity (mAmp-hrs) of all the anode active materials in the anode. The theoretical capacity of the cathode, unless otherwise specified, is the sum of the theoretical capacity (mAmp-hrs) of all the cathode active materials in the cathode. It will be understood that the theoretical capacity of anode and cathode applies to only that portion of the anode and cathode layers which are facing each other with separator therebetween so that the active materials therein are capable of discharging. Also, it is understood that the theoretical capacity (mAmp-hrs) of the anode and theoretical capacity (mAmp-hrs) of the cathode, respectively, are based on all the "anode active materials" and all the "cathode active materials", respectively, usefully discharging. That is, it is based on 100 percent utilization of the anode active materials and 100 percent utilization of the cathode active materials, respectively, according to the normal discharge reactions occurring in the cell with respect to those active materials.

The above indicated $Li/FeS_2$ cell balance (theoretical capacity (mAmp-hrs) of the anode greater than the theoretical capacity (mAmp-hrs) of the cathode) is preferably made in conjunction with increasing the interfacial surface area for a given size wound cell, for example, AA or AAA size cells. For example, in a AA size cell the interfacial surface area between anode and cathode is increased to a level greater than about 250 cm$^2$, preferably between about 250 and 400 cm$^2$, desirably at about 300 cm$^2$. The interfacial area is the facing area between the anode and cathode with separator therebetween. By increasing the interfacial surface area between anode and cathode the ratio of theoretical cathode capacity (mAmp-hrs) to interfacial surface area (cm²) is reduced. This also reduces the current density (mAmp/cm² interfacial area) for any given current drain rate (mAmp). The reduction in ratio of theoretical cathode capacity to interfacial area improves the discharge utilization of the cathode as it generally results in thinner cathodes. (The term "utilization" as used herein is the percent of theoretical capacity which is actually attained during cell discharge.) The increase in interfacial surface area is desirably such that the cell's total capacity is not compromised, despite the thinner cathodes. The improvement in cathode utilization is more apparent at high rate discharge needed to power digital cameras.

When the Li/FeS₂ cell is balanced in accordance with the invention so that the theoretical capacity of the anode (mAmp-hrs) is greater than the theoretical capacity of the cathode (mAmp-hrs) there is less chance of discontinuities "severing" developing on the surface of the lithium anode. Such discontinuities can cause poor discharge performance and are more apt to develop if the cathode is in theoretical capacity excess, wherein the lithium anode sheet may be made too thin in relation to the cathode capacity. Also, when the cell is balanced in accordance with the invention so that the theoretical capacity of the anode (mAmp-hrs) is greater than the theoretical capacity of the cathode (mAmp-hrs), the slope of the cell's discharge curve (voltage vs. time) tends to be more pronounced starting at a point well before the cell reaches the end of its useful discharge life. This creates an opportunity to recognize when the cell is close to end of life. Such feature is extremely important for example in medical applications.

In accordance with the invention the ratio of theoretical cathode capacity to interfacial area for Li/FeS₂ wound cells, in particular AA size cells, is between about 9 and 17 mAmp-hrs/cm² preferably between about 11 and 15 mAmp-hrs/cm². If each side of the substrate 65 is coated with cathode material 60 then the preceding ratios of between 11 and 15 mAmp-hrs/cm² are applied to each side.

The Li/FeS₂ cell as in cell 10 has the following basic discharge reactions (one step mechanism):

Anode:

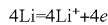

$$4Li = 4Li^+ + 4e \qquad \text{Eq. 1}$$

Cathode:

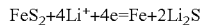

$$FeS_2 + 4Li^+ + 4e = Fe + 2Li_2S \qquad \text{Eq. 2}$$

Overall:

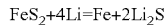

$$FeS_2 + 4Li = Fe + 2Li_2S \qquad \text{Eq. 3}$$

The Li/FeS₂ cylindrical cell 10 may be in the form of a primary (nonrechargeable) cell.

The theoretical specific capacity (mAmp-hr/g) of FeS₂ can be calculated as follows based on a 4 electron transfer per molecule, wherein 2 electrons reduce $Fe^{+2}$ to elemental iron Fe and 2 electrons reduce $S^{-1}$ to $2S^{-2}$ forming $Fe+2Li_2S$. The molecular weight (M.W.) of FeS₂ is 119.97 and the M.W. of Li is 6.941. The charge $q_o$ of an electron is $1.602 \times 10^{-19}$ coulomb/electron. 1 coul=1 Amp-sec. Avogadro's number $A_0$ is $6.023 \times 10^{23}$ molecules per mol. Let $F = q_o \times A_0 \times 3600$ sec/hr=26.802 Amp-hr. The theoretical specific capacity of FeS₂ can be calculated as $26.802 \times 4/119.97 = 0.8936$ Amp-hr/g=893.6 mAmp-hr/g. The theoretical specific capacity of Li can be calculated as $26.802 \times 1/6.941 = 3.8614$ Amp-hr/g=3861.4 mAmp-hr/g.

A preferred cathode slurry mixture is presented in Table 1:

TABLE I

| Cathode Composition | |
|---|---|
|  | Wet Slurry (wt. %) |
| Binder (Kraton G1651) | 2.0 |
| Hydorcarbon Solvent (ShellSol A100) | 13.4 |
| (ShellSol OMS) | 20.2 |
| FeS₂ Powder (Pyrox Red 325) | 58.9 |
| Graphite (Timrex KS6) | 4.0 |
| Acetylene Carbon Black(Super P) | 1.5 |
| Total | 100.0 |

This same or similar wet cathode slurry mixture (electrolyte not yet added to the cell) is disclosed in commonly assigned application Ser. No. 11/516,534, filed Sep. 6, 2006. The total solids content of the wet cathode slurry mixture as shown in above Table 1 is 66.4 wt. %. Thus the FeS₂ content in the dry cathode would be 58.9/66.4=88.7 wt. %.

The Li/FeS₂ cell may be in the configuration of a cylindrical cell 10 as shown in FIG. 1. The cylindrical cell 10 may have a spirally wound anode sheet 40, cathode 60 with separator sheet 50 therebetween as shown in FIGS. 2-5. The Li/FeS₂ cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide (FeS₂) commonly known as "pyrite". The cell is preferably cylindrical as shown in the figures and may be of any size, for example, AAAA (42×8 mm), AAA (44×10 mm), AA (50×14 mm), C (49×25.5 mm), and D (60×33 mm) size. Thus, cell 10 depicted in FIG. 1 may also be a ⅔ A cell (35×15 mm). However, it is not intended to limit the cell configuration to cylindrical shape. Alternatively, the cell of the invention may have an anode comprising lithium metal and a cathode comprising iron disulfide (FeS₂) having the composition and nonaqueous electrolyte as herein described in the form of a spirally wound prismatic cell, for example a rectangular cell having the overall shape of a cuboid. The Li/FeS₂ cell is not limited to a spirally wound configuration but the anode and cathode, for example, may be placed in stacked arrangement for use in coin cells.

Figure 3:
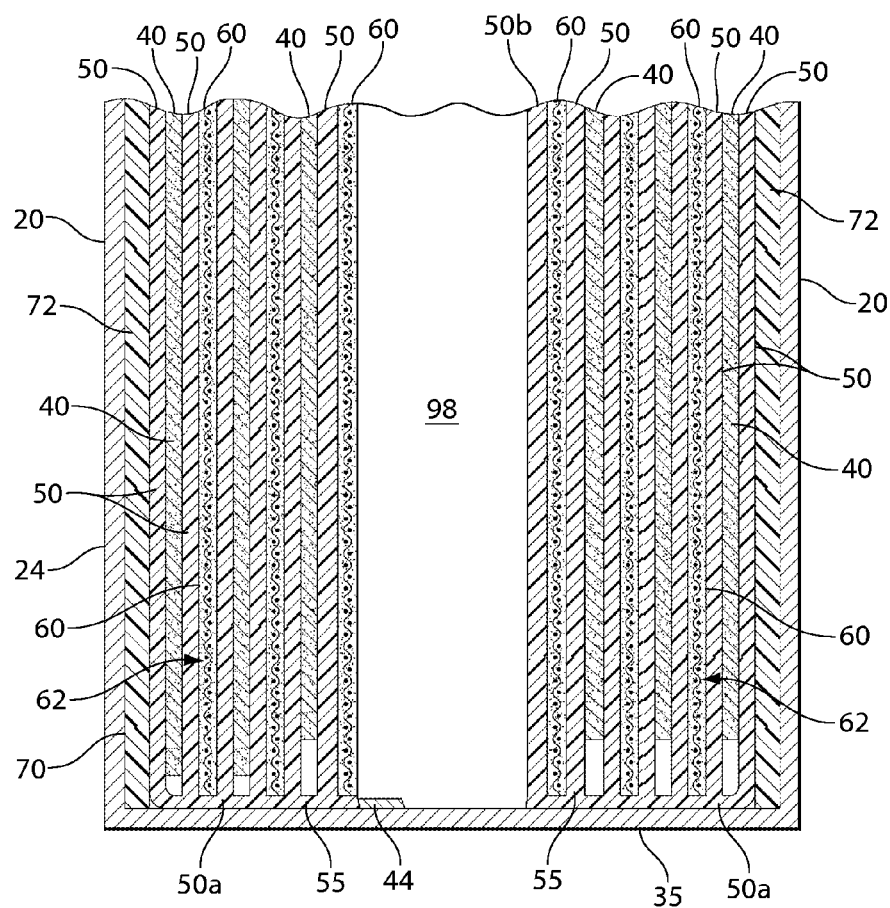
FIG. 3 is a partial cross sectional elevation view of the cell taken through sight lines 2-2 of FIG. 1 to show a spirally wound electrode assembly.
Figure 4:
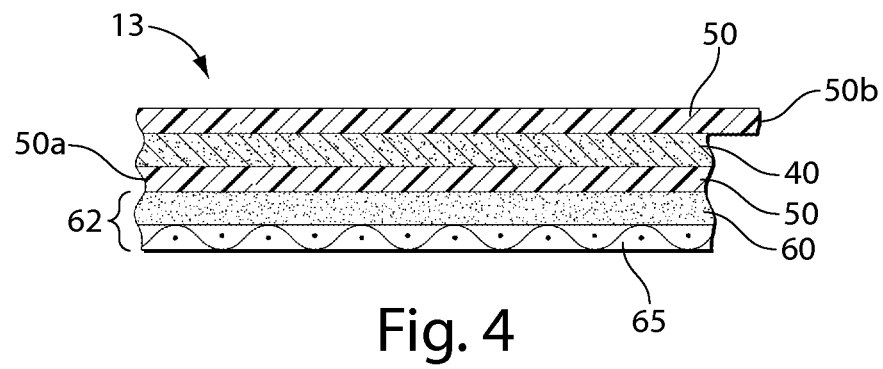
FIG. 4 is a schematic showing the placement of the layers comprising the electrode assembly.
Figure 5:
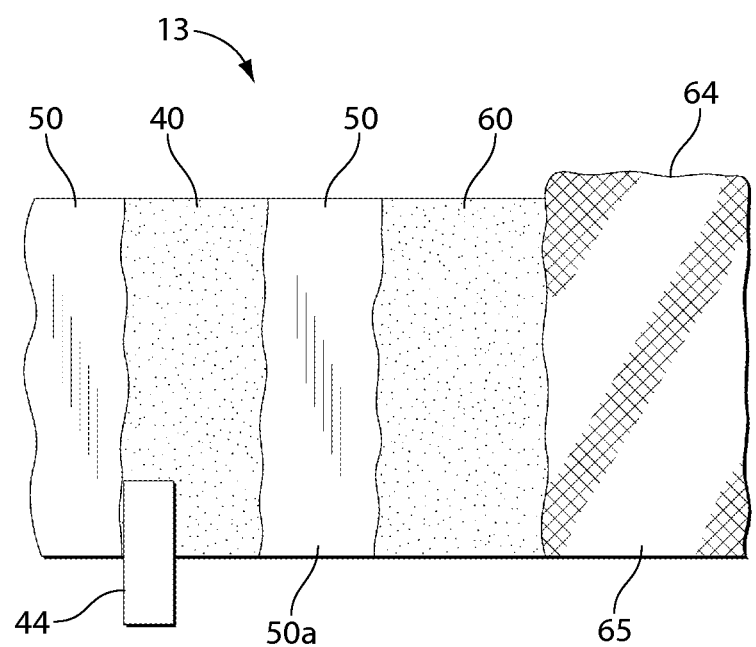
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide (FeS₂) coated onto metallic substrate 65 (FIG. 4).

The electrode composite 13 (FIGS. 4 and 5) can be made in the following manner: The cathode 60 comprising iron disulfide (FeS₂) powder dispersed therein can be initially prepared in the form of a wet slurry which is coated onto a side of conductive substrate sheet 65, preferably a sheet of aluminum or stainless steel which may a solid sheet with or without apertures therethrough, to form a cathode composite sheet 62 (FIG. 4). Conventional roll coating techniques may be used to coat the wet slurry onto a side of conductive substrate 65 (FIGS. 4 and 5). If an aluminum sheet 65 is used it may be a solid sheet of aluminum without openings therethrough or may be a sheet of expanded or perforated aluminum foil with openings therethrough thus forming a grid or screen. The apertures in substrate sheet 65 may be the result of punching or piercing holes therein.

The wet cathode slurry mixture having the composition shown above in Table 1 comprising iron disulfide (FeS$_2$), binder, conductive carbon, and solvents is prepared by mixing the components shown in Table 1 until a homogeneous mixture is obtained.

The above quantities of components (Table 1) can be scaled proportionally so that small or large batches of cathode slurry can be prepared. The wet cathode slurry thus preferably has the following composition: FeS$_2$ powder (58.9 wt. %); Binder, Kraton G1651 (2 wt. %); Graphite, Timrex KS6 (4.0 wt %), Acetylene Black, Super P (1.5 wt %), Hydrocarbon Solvents, ShellSol A100 (13.4 wt %) and ShellSol OMS (20.2 wt %).

After the wet cathode slurry is formed (Table 1), the wet slurry is then coated onto a side of the conductive substrate 65. The conductive substrate 65 with wet cathode slurry coated thereon is then dried in conventional convective oven (or in inert gas) to evaporate the solvents in the slurry, thereby forming a dry cathode coating 60 on one side of conductive substrate 65 (FIGS. 4 and 5). The process is repeated, if desired, to also coat the opposite side of conductive substrate 65 with the wet cathode slurry (Table 1). The wet cathode slurry on the opposite side of conductive substrate 65 can then be subjected to drying in a convective oven to evaporate solvents, thereby forming a dry cathode coating 60 also on the opposite side of conductive substrate 65. The drying of the wet cathode slurry coated on the metal substrate 65 is accomplished preferably by gradually adjusting or ramping up the oven temperature (to avoid cracking the coating) from an initial temperature of 40° C. to a final temperature not to exceed 130° C. for about 7-8 minutes or until the solvent has substantially all evaporated. (At least about 95 percent by weight of the solvents are evaporated, preferably at least about 99.9 percent by weight of the solvents are evaporated.) The dry cathode coating 60 (whether applied to only one side or both sides of conductive substrate 65) is then subjected to calendering to compress the thickness of said dry cathode 60, thus forming the completed cathode composite 62 (FIGS. 4 and 5).

The anode 40 can be prepared from a solid sheet of lithium metal. The anode 40 is desirably formed of a continuous sheet of lithium metal (99.8% pure). The lithium metal in anode 40 may be alloyed with small amounts of other metal, for example aluminum, or calcium which typically comprises less than about 1 or 2 wt. %, and even up to about 5 wt. % of the lithium alloy. The lithium which forms the anode active material, is preferably in the form of a thin foil. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of between about 0.09 and 0.20 mm desirably between about 0.09 and 0.19 mm for the spirally wound cell.

Individual sheets of electrolyte permeable separator material 50, preferably of microporous polypropylene or polyethylene having a thickness of about 0.025 mm or less is inserted on each side of the lithium anode sheet 40 (FIGS. 4 and 5). In a preferred embodiment the separator sheet may be microporous polyethylene or polypropylene of thickness about 0.016 mm. The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
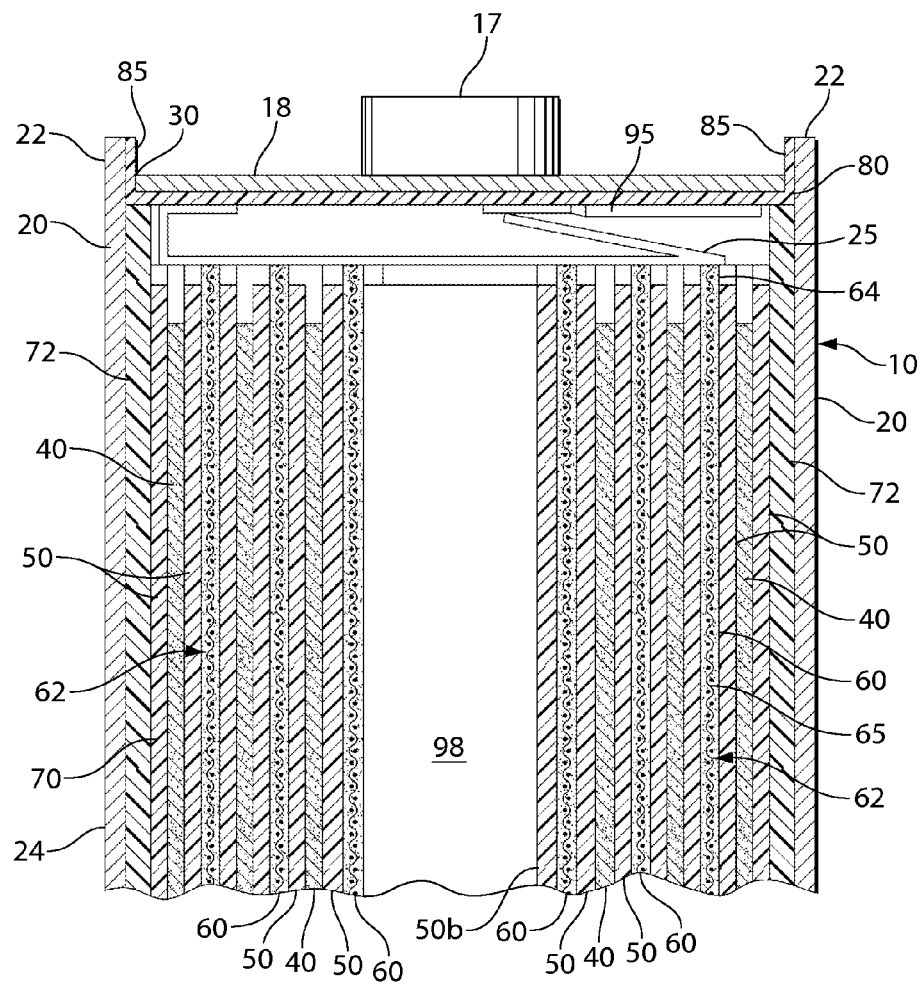
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polyester tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

A nonaqueous electrolyte mixture can then be added to the wound electrode spiral 70 after it is inserted into the cell casing 20. The desired nonaqueous electrolyte comprises a lithium salt LiCF$_3$SO$_3$ (LiTFS) or Li(CF$_3$SO$_2$)$_2$N (LiTFSI) dissolved in an organic nonaqueous solvent. A desirable electrolyte solvent has been disclosed in commonly assigned application Ser. No. 11/516,534, filed Sep. 6, 2006, and has published as U.S. 2008/0057403 A1. Such electrolyte, for example, may comprise a solution comprising 0.8 molar (0.8 mol/liter) concentration of LiTFSI salt dissolved in an organic solvent mixture comprising about 75 vol. % methyl acetate (MA), 20 vol. % propylene carbonate (PC), and 5 vol. % ethylene carbonate (EC). Elemental iodine in the amount comprising about 0.5 wt % of the electrolyte is desirably added to the electrolyte, as in commonly assigned U.S. patent application Ser. No. 11/516,534, and has published as U.S. 2008/0057403 A1. The electrolyte mixture is desirably added on the basis of about 0.4 gram electrolyte solution per gram FeS$_2$ for the spirally wound cell (FIG. 2). Another desirable electrolyte is comprised of a mixture of Li(CF$_3$SO$_2$)$_2$N (LiTFSI) salt dissolved in a solvent mixture of 1,3 dioxolane (75 vol %) and sulfolane (25 vol %), as in commonly assigned U.S. patent application Ser. No. 11/494,244, and has published as U.S. 2008/0076029 A1.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 may be flared along its top edge forming an extended portion 64 extending from the top of the wound spiral as shown in FIG. 2. The flared cathode substrate portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel, or nickel plated steel, can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of closed end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp in a AA size cell for a prolonged period, the resistance of the PTC device increases dramatically, thus shutting down the abnormally high drain. It will be appreciated that devices other than vent 19 and PTC device 95 may be employed to protect the cell from abusive use or discharge.

In accordance with the invention it has been determined that in a Li/FeS$_2$ cell, such as representative wound cell 10, the cathode capacity utilization, particularly at high rate discharge, can be improved if the cathode is designed so that the ratio of cathode theoretical capacity (mAmp-hrs) to electrode interfacial area is reduced. The electrode interfacial area is the facing area between the anode 40 and cathode 60 with separator sheet 50 therebetween. The cathode utilization is the cathode efficiency as measured by the actual cathode capacity (mAmp-hrs) divided by the theoretical cathode capacity. (In a Li/FeS$_2$ cell the theoretical specific capacity of lithium metal is high at 3861.4 mAmp-hr/gram and the theoretical specific capacity of FeS$_2$ is 893.6 mAmp-hr/gram. The FeS$_2$ theoretical specific capacity is based on a 4 electron transfer from 4Li per FeS$_2$ molecule to result in reaction product of elemental iron Fe and 2Li$_2$S as above discussed. The actual theoretical cathode capacity of the FeS$_2$ is thus the weight of the FeS$_2$ in the cathode times the theoretical specific capacity of FeS$_2$.)

When the Li/FeS$_2$ cell is designed so that the cathode theoretical capacity to interfacial area is reduced in accordance with the invention, the cathode in effect can be made thinner. This improves cathode utilization and increases cell voltage, particularly at high rate discharge conditions, for example, simulating use of the cell in powering digital cameras.

A benefit of the improved Li/FeS$_2$ cell design resulting in higher cathode utilization and higher load voltage is that it becomes possible to employ lithium metal in the anode in amount so that the ratio of anode theoretical capacity (mAmp-hrs) to cathode theoretical capacity is greater than 1.0. This is made feasible in particular if the cell, for example, an AA or AAA size cell, is designed so that the ratio of cathode theoretical capacity to interfacial area is between about 9 and 17 mAmp-hrs/cm$^2$, preferably between about 11 and 15 mAmp-hrs/cm$^2$ per side of substrate 65 onto which cathode 60 is coated. This in turn results in improved cathode utilization. Cathode theoretical capacity to interfacial area of between about 11 and 15 mAmp-hrs/cm$^2$ per side of substrate 65 corresponds to a loading of FeS$_2$ actives in the cathode of between about 0.0123 g/cm$^2$/side and 0.0168 g/cm$^2$/side, if FeS$_2$ is the only cathode active material in the cathode. (The term "side" as used herein means each major side of substrate 65 onto which cathode 60 is coated.) Designing the AA or AAA size cylindrical cell in this manner allows for inclusion of lithium metal in the anode in excess amount, that is, so that the ratio of anode theoretical capacity (mAmp-hrs) to cathode theoretical capacity s greater than 1.0, for example between about 1.02 and 1.20, desirably between about 1.05 and 1.15. The total interfacial area (cm$^2$) for the cell can be increased compared to conventional cells, since at least the cathode layer 60 is made thinner because of the reduced cathode loading. That is, the cathode loading of cathode actives is desirably reduced to a theoretical cathode capacity to interfacial area ratio desirably between about 11 and 15 mAmp-hrs/cm$^2$ per side of substrate 65. A thinner separator sheet 50 is thus also desired in order not to reduce overall cell capacity. The inclusion of a thinner separator 50 in the cell design allows volume for the overall larger size separator area and greater amount of cathode foil substrate 65 needed because of the increased anode/cathode interfacial area. This enables use of thinner cathode and anode, without reducing the overall capacity of the cell.

Since the cathode discharges to full capacity before the anode under the above design conditions of the invention, there will be enough lithium remaining on the surface of the anode so the problem of severing of anode material is avoided. Severing of anode material can occur if the anode to cathode theoretical capacity ratio is less than 1.0. Severing of the anode can lead to breakage of the electrical contact between the anode 40 and current collector tab 44 and in turn will cause disruption in cell performance.

EXAMPLE

Test AA size cylindrical cells were made in accordance with the preceding description and are representative of a specific embodiment of the invention. The test AA cells were all identical and made according to the following specifications.

The cathode was coated in the form of a wet cathode slurry as earlier described herein onto both sides of an aluminum foil substrate 65. The aluminum foil had a thickness of about 15 micron. The wet cathode slurry was coated first on one side of foil substrate 65 and then dried as described herein. The wet cathode slurry was then coated onto the opposite side of substrate 65 and then dried. The dried cathode coatings 60 were then calendered to compress the coating thickness, thus forming a dry coating 60 on both sides of substrate 65 resulting in cathode composite 62. The cathode composite 62 had a total thickness of about 0.124 mm, which includes the thickness of substrate 65 (15 micron) and dry cathode coating 60 on both sides of substrate 65. The dry cathode coating 60 had the following composition: FeS$_2$ powder (Pyrox Red 325) 88.7 wt. %, acetylene black (Super P from Timcal Co.) 2.3 wt. %, graphite (Timrex KS6 from Timcal Co.) 6.0 wt. %, binder (Kraton G1651 from Kraton Polymers) 3.0 wt. %. The FeS$_2$ powder in the cathode had a loading of about 0.0144 g/cm$^2$ per side, which is equivalent to a theoretical capacity of about 12.86 mAmp-Hr/cm$^2$ per side. The cells had a total anode/cathode interfacial area of about 150 cm$^2$ per side of substrate 65 or 300 cm$^2$ total. (At high rate drain at 1 Amp this corresponds to a current density of about 0.0033 Amp/cm$^2$.) (At high rate drain at 1 Amp this corresponds to a current density of about 0.0033 Amp/cm$^2$.) Total FeS$_2$ loading capable of discharge in the cell is about 0.0144 g/cm$^2$ per side×150 cm$^2$ per side=2.16 g per side. (The total FeS$_2$ loading capable of discharge in this example is the total weight of FeS$_2$ in both sides of substrate 65 facing the anode sheet 40 with separator sheet 50 therebetween. Thus the theoretical capacity of the cathode is: 2.16 g (FeS$_2$) per side×893.6 mAmp-hr/g×2 sides=3860 mAmp-hr.

The anode 40 was formed from a sheet of lithium metal having sufficient thickness that the anode to cathode interfacial theoretical capacity ratio was about 1.02. Thus the theoretical capacity of the lithium in the cell capable of discharge was 1.02×3860 mAmp-hr=3937 mAmp-hr. The weight lithium in the cell capable of discharge was thus 3937 mAmp-hr divided by 3861.4 mAmp-hr/g=1.02 g. The separator was formed of a sheet of microporous polyethylene having a thickness of about 0.016 mm. The electrolyte added to the cell comprised a mixture of Li(CF$_3$SO$_2$)$_2$N (LiTFSI) salt (0.8 mols/liter) dissolved in a solvent mixture of 1,3 dioxolane (75 vol %) and sulfolane (25 vol %), as in commonly assigned U.S. patent application Ser. No. 11/494,244, and has published as U.S. 2008/0076029 A1.

After the Test AA cells were filled, they were predischarged slightly to a depth of discharge of about 3 percent of the cell's capacity and then stored at room temperature for 3 days. The cells were then subjected to the Digicam test described below.

The Test AA cells were discharged to a cutoff voltage of about 1.05 Volts using a digital camera discharge test (Digicam test).

The digital camera test (Digicam test) consists of the following pulse test protocol wherein each test cell was drained by applying pulsed discharge cycles to the cell: Each cycle consists of both a 1.5 Watt pulse for 2 seconds followed immediately by a 0.65 Watt pulse for 28 seconds. These cycles are repeated 10 times followed by 55 minutes rest. Then the cycles are repeated until the cutoff voltage is reached. (The first pulse mimics the power of the digital camera required to take a picture and the second pulse mimics the power to view the picture taken.) The cycles are continued until a cutoff voltage of 1.05V is reached. The total number of the 1.5 Watt pulses required to reach these cutoff voltages were recorded. The average number of these pulses for the Test cells to a cutoff voltage of about 1.05V were about 644. This is considered to represent excellent performance for these Li/FeS$_2$ cells which were made in accordance with the invention. The discharge of the cell occurred smoothly without unintended delay or interruption. This indicated that there was no discontinuities developing on the lithium layer surface.

Although the invention has been described with reference to specific embodiments, it should be appreciated that other embodiments are possible without departing from the concept of the invention and are thus within the claims and equivalents thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A primary AAA-size electrochemical cell comprising:
 a housing;
 a positive terminal and a negative terminal;
 an anode comprising at least one of a lithium metal and lithium alloy as anode active material;
 a cathode comprising iron disulfide (FeS$_2$) as cathode active material and conductive carbon; and
 a separator sheet between the anode and the cathode;
 wherein the cell is balanced so that a ratio determined by a theoretical capacity of the anode (mAmp-hrs) divided by a theoretical capacity of the cathode (mAmp-hrs) is greater than 1.0, the theoretical capacity of the anode and the theoretical capacity of the cathode are based on a dischargeable portion of the anode and a dischargeable portion of the cathode that have the separator sheet therebetween;
 the anode and the cathode must be opposite to and facing one another with the separator sheet disposed therebetween in order for the anode and the cathode to be dischargeable; and
 the theoretical capacity of the cathode is between approximately 1650 mAmp-hrs and approximately 3000 mAmp-hrs.

2. The cell of claim 1 wherein the cathode comprises a coating comprising iron disulfide particles coated onto both sides of a substrate.

3. The cell of claim 2 wherein the substrate comprises aluminum or stainless steel.

4. The cell of claim 1 wherein the anode and the cathode are in a wound configuration with the separator sheet therebetween.

5. The cell of claim 1 wherein the theoretical capacity of the anode includes the theoretical capacity of all anode active materials therein; and
 the theoretical capacity of the cathode includes the theoretical capacity of all cathode active materials therein.

6. The cell of claim 5 wherein the cathode active material consists essentially of FeS$_2$.

7. The cell of claim 1 wherein the ratio determined by the theoretical capacity of the anode divided by the theoretical capacity of the cathode is between about 1.02 and 1.20.

8. The cell of claim 1 wherein the ratio determined by the theoretical capacity of the anode divided by the theoretical capacity of the cathode is between about 1.05 and 1.15.

9. The cell of claim 1, wherein the cell is balanced so that a ratio determined by the theoretical mAmp-hr capacity of the lithium in the anode divided by the theoretical mAmp-hr capacity of the $FeS_2$ in the cathode is between about 1.02 and 1.20;

the theoretical capacity of the lithium is based on the theoretical specific value of 3861.4 mAmp-hrs/g; and the theoretical capacity of the $FeS_2$ is based on the theoretical specific value of 893.6 mAmp-hr/g.

10. The cell of claim 1 wherein the separator sheet is formed of microporous material comprising polyethylene or polypropylene having a thickness between about 0.008 and 0.025 mm.

11. The cell of claim 1 wherein the ratio of theoretical capacity of the cathode to an interfacial surface area between the anode and the cathode is between about 9 and 17 mAmp-hrs per $cm^2$ per side of a substrate.

12. The cell of claim 11 wherein the ratio of theoretical capacity of the cathode to the interfacial surface area between the anode and the cathode is between about 11 and 15 mAmp-hrs per $cm^2$ per side of the substrate.

13. The cell of claim 1 wherein the interfacial surface area between the anode and the cathode is between 150 and 200 $cm^2$.

* * * * *